(12) United States Patent
Power

(10) Patent No.: US 11,504,591 B2
(45) Date of Patent: *Nov. 22, 2022

(54) SELF-CENTERING MANDREL FOR GOLF CLUB HOSELS

(71) Applicant: Callaway Golf Company, Carlsbad, CA (US)

(72) Inventor: Alex Power, Carlsbad, CA (US)

(73) Assignee: Topgolf Callaway Brands Corp., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/469,379

(22) Filed: Sep. 8, 2021

(65) Prior Publication Data
US 2021/0402271 A1    Dec. 30, 2021

Related U.S. Application Data

(62) Division of application No. 16/894,464, filed on Jun. 5, 2020, now Pat. No. 11,123,621.

(60) Provisional application No. 62/857,737, filed on Jun. 5, 2019.

(51) Int. Cl.
*A63B 60/42*    (2015.01)
*A63B 53/02*    (2015.01)
*G01B 5/00*     (2006.01)

(52) U.S. Cl.
CPC .............. *A63B 60/42* (2015.10); *A63B 53/02* (2013.01); *A63B 53/023* (2020.08); *G01B 5/0018* (2013.01)

(58) Field of Classification Search
CPC ....... A63B 60/42; A63B 53/02; A63B 53/023; A63B 53/025; A63B 53/026; G01B 5/0018; G01B 5/0023

USPC ...... 33/268, 508, 227; 42/116; 473/244–246
See application file for complete search history.

(56) References Cited

U.S. PATENT DOCUMENTS

| | | | | |
|---|---|---|---|---|
| 2,773,309 A * | 12/1956 | Elliott | ........................ | F41G 1/54 42/134 |
| 3,612,949 A * | 10/1971 | Becraft | ..................... | G01C 5/00 33/286 |
| 3,782,832 A * | 1/1974 | Hacskaylo | ............ | F41G 3/2622 356/138 |
| 4,359,889 A * | 11/1982 | Kelly | ......................... | F28F 9/16 29/890.044 |
| 4,825,258 A * | 4/1989 | Whitson | .................... | F41G 1/54 33/286 |
| 5,138,156 A * | 8/1992 | Lee, III | ..................... | G12B 5/00 359/350 |
| 5,365,669 A * | 11/1994 | Rustick | .................... | F41A 33/02 42/134 |
| 5,446,535 A * | 8/1995 | Williams | ................. | F41G 3/323 33/286 |
| 5,618,099 A * | 4/1997 | Brubacher | .............. | F41G 1/545 42/117 |
| 5,787,631 A * | 8/1998 | Kendall | .................... | F41A 33/02 42/116 |

(Continued)

*Primary Examiner* — Sebastiano Passaniti
(74) *Attorney, Agent, or Firm* — Rebcca Hanovice; Michael A. Catania; Sonia Lari

(57) ABSTRACT

A laser mandrel system that self-centers within a hosel bore of a golf club head to allow for precision adjustment of lie and loft is disclosed herein. The mandrel includes a one-piece housing with upper and lower portions, a laser centered within the upper portion of the housing, and a plurality of o-rings extending around an exterior or interior surface of a lower portion of the housing.

16 Claims, 5 Drawing Sheets

(56) References Cited

U.S. PATENT DOCUMENTS

| | | | | |
|---|---|---|---|---|
| 6,061,918 A * | 5/2000 | Schnell | ................... | F41G 3/323 |
| | | | | 42/121 |
| 6,295,753 B1 * | 10/2001 | Thummel | ................ | F41A 33/02 |
| | | | | 42/116 |
| 6,439,892 B1 * | 8/2002 | Gerber | ................... | G01S 7/481 |
| | | | | 434/21 |
| 6,449,867 B1 * | 9/2002 | Scott | ................ | G01B 5/0004 |
| | | | | 33/549 |
| 6,482,101 B1 * | 11/2002 | Posma | ................. | A63B 60/42 |
| | | | | 473/409 |
| 7,093,842 B2 * | 8/2006 | Chmelar | ................ | A63C 17/01 |
| | | | | 280/87.041 |
| 7,403,277 B2 * | 7/2008 | Goodjohn | ............ | G01B 5/0023 |
| | | | | 473/282 |
| 7,530,192 B2 * | 5/2009 | Grauslys | ................... | F41G 1/30 |
| | | | | 42/131 |
| 7,765,703 B2 * | 8/2010 | Buckus | ..................... | B64F 5/10 |
| | | | | 33/645 |
| 7,861,425 B2 * | 1/2011 | Buckus | ..................... | B64F 5/10 |
| | | | | 33/286 |
| 7,905,043 B2 * | 3/2011 | Hopkins | ................... | F42B 5/02 |
| | | | | 42/114 |
| 11,123,621 B1 * | 9/2021 | Power | ................... | A63B 60/42 |
| 2012/0167440 A1 * | 7/2012 | StPhillips | .............. | F41A 21/32 |
| | | | | 42/116 |
| 2015/0292878 A1 * | 10/2015 | Lenz | ........................ | F16H 7/02 |
| | | | | 33/286 |
| 2020/0103201 A1 * | 4/2020 | Cabrera | ................... | F41G 1/02 |

* cited by examiner

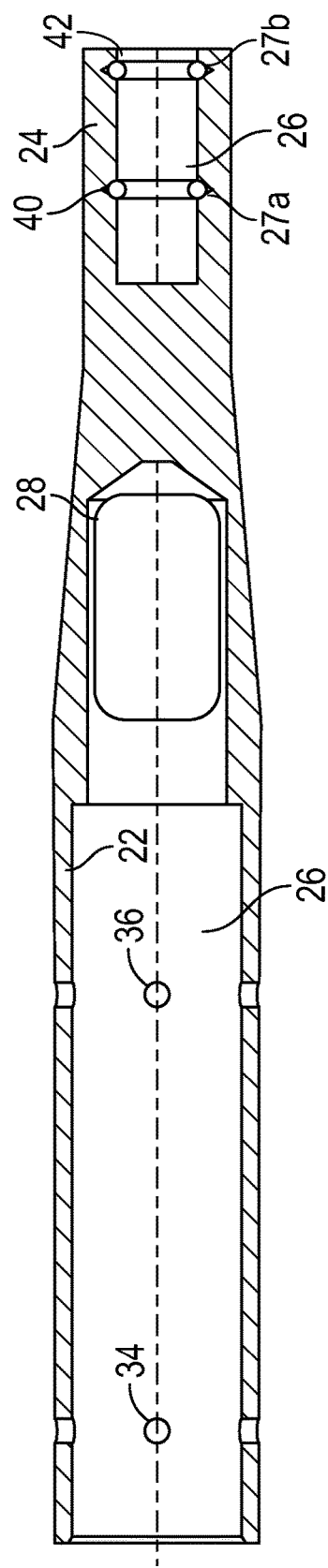
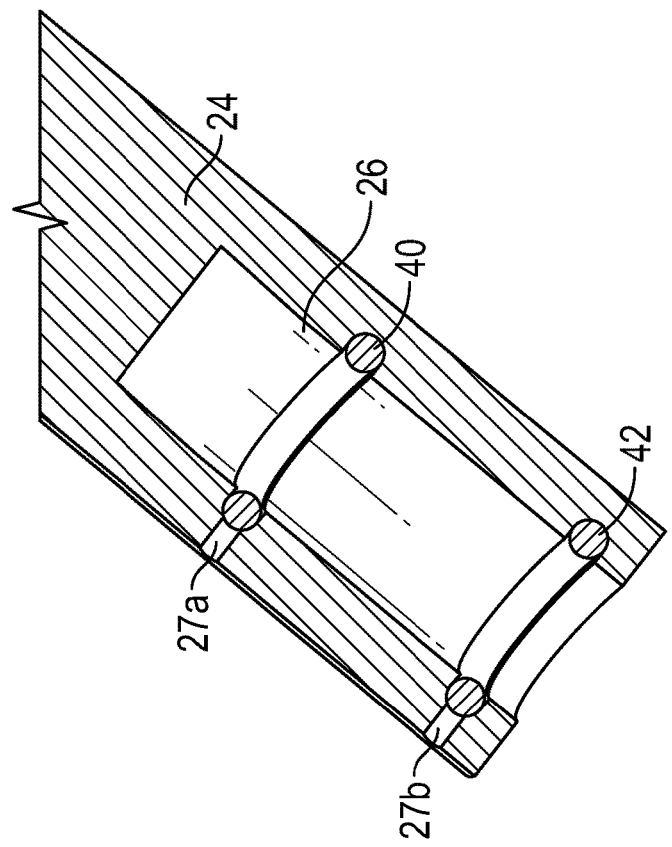

SELF-CENTERING MANDREL FOR GOLF CLUB HOSELS

CROSS REFERENCES TO RELATED APPLICATIONS

The present application is a division of U.S. patent application Ser. No. 16/894,464, filed on Jun. 5, 2020, and issued on Sep. 21, 2021, as U.S. Pat. No. 11,123,621, which claims priority to U.S. Provisional Application No. 62/857,737, the disclosure of each of which is hereby incorporated by reference in its entirety herein.

STATEMENT REGARDING FEDERALLY SPONSORED RESEARCH OR DEVELOPMENT

Not Applicable

BACKGROUND OF THE INVENTION

Field of the Invention

The present invention relates to a self-centering mandrel for use in golf club hosel manufacturing and bending processes.

Description of the Related Art

Golf club manufacturers wishing to adjust the hosels of their golf club heads after the heads are created typically use a single laser mandrel system that is intended to fit all hosel manufacturing processes. This one-size fits all approach often leads to gaps between the hosel and mandrel, allowing the mandrel to sit off center within the hosel bore and thereby reducing hosel loft and lie tolerances during manufacture.

Furthermore, existing laser mandrels are typically composed of three pieces that are not precision aligned to the center of the mandrel axis. Other problems include the fact that the laser housings of these prior art systems are not precision aligned to the center of the laser housings, the laser housings are not precision aligned to the center of the metal housings, and the metal housings are not connected to the mandrel sections of the part. Tolerance stack between these three components decreases the hosel bending tolerance significantly. The materials from which these prior art mandrel systems are made also affect the wear properties of the prior art mandrels. Once the prior art unit has been used for a certain number of clubs, the variation further increases because the fit between hosel and mandrel loosens with each use.

In view of these challenges presented by prior art mandrel systems, there is a need for a more resilient mandrel system that reduces the variation in hosel loft and lie during golf club head manufacturing.

BRIEF SUMMARY OF THE INVENTION

The present invention relates to a self-centering laser mandrel system that fits within a hosel bore or around an extruded hosel, measures the loft and lie of the hosel accurately, and thereby reduces the variation in loft and lie bending operations by golf club head manufacturers. The reduction in variation allows manufacturers to tighten the loft and lie tolerances of the hosels on their golf club heads, and reduce manufacturing cycle time by eliminating post-bending measurement processes (back and forth processes).

One aspect of the present invention is a mandrel comprising a one-piece housing comprising an upper portion with a first diameter, a lower portion with a second diameter, and a housing bore disposed within at least the upper portion, a laser disposed in the hosel bore within the upper portion, the laser comprising a beam emitter and a laser housing, and at least one o-ring at least partially encircling a surface of the lower portion. In some embodiments, the second diameter may be less than the first diameter. In any of the embodiments, the at least one o-ring may comprise first and second o-rings. In yet another embodiment, the upper portion of the housing may comprise a window, and at least a portion of the laser housing may be visible through the window. In yet another embodiment, the one-piece housing may be composed of a steel, such as an A2 steel, and may have a hardness value of 59-60 HRC. In any of the embodiments, the at least one o-ring may be composed of a polyurethane, which may have a durometer measurement of 90 A. In another embodiment, the laser housing may be aligned to a beam emitted by the beam emitter to within 0.5 miliradian. In still another embodiment, the laser housing may be aligned to the mandrel housing to within 0.35 miliradian. In any of the embodiments, the mandrel may further comprise a plurality of set screws extending through the housing to contact the laser housing. These set screws may be composed of eight set screws, and each of the set screws may be locked in place by a thread locker, which may be composed of a nylon material.

Another aspect of the present invention is a method comprising the steps of providing a mandrel comprising a one-piece housing with upper and lower portions, a laser disposed within the housing, and at least one o-ring extending around an external surface of the lower portion of the housing, providing a golf club head comprising a hosel with a hosel bore, inserting at least the lower portion of the mandrel into the hosel so that the at least one o-ring is disposed within the hosel bore, and measuring at least one of the loft and lie of the hosel. In some embodiments, the mandrel may further comprise a plurality of set screws extending into the housing and contacting the laser, and the plurality of set screws may align the laser within the one-piece housing. In another embodiment, the at least one o-ring may create pressure within the hosel bore. In another embodiment, the one-piece housing may be composed of A2 steel and each of the plurality of o-rings may be composed of a high durometer polyurethane.

Yet another aspect of the present invention is a method comprising the steps of providing a mandrel comprising a one-piece housing with hollow upper and hollow lower portions, a laser disposed within the upper portion of the housing, and at least one o-ring disposed within the hollow lower portion and extending around an inner surface of the lower portion of the housing, providing a golf club head comprising an extruded hosel, inserting at least a portion of the extruded hosel into the lower portion of the housing so that the at least one o-ring encircles the extruded hosel, and measuring at least one of the loft and lie of the hosel.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 2 is a cross sectional view of the mandrel shown in FIG. 1 taken along lines 2-2.

FIG. 3 is a cross sectional view of the mandrel shown in FIG. 1 without a laser taken along lines 3-3.

DETAILED DESCRIPTION OF THE INVENTION

The present invention is directed to a laser mandrel 10 that self-centers within a bore 52 of a golf club hosel 50 or around an extruded golf club hosel 55.

Figure 1:
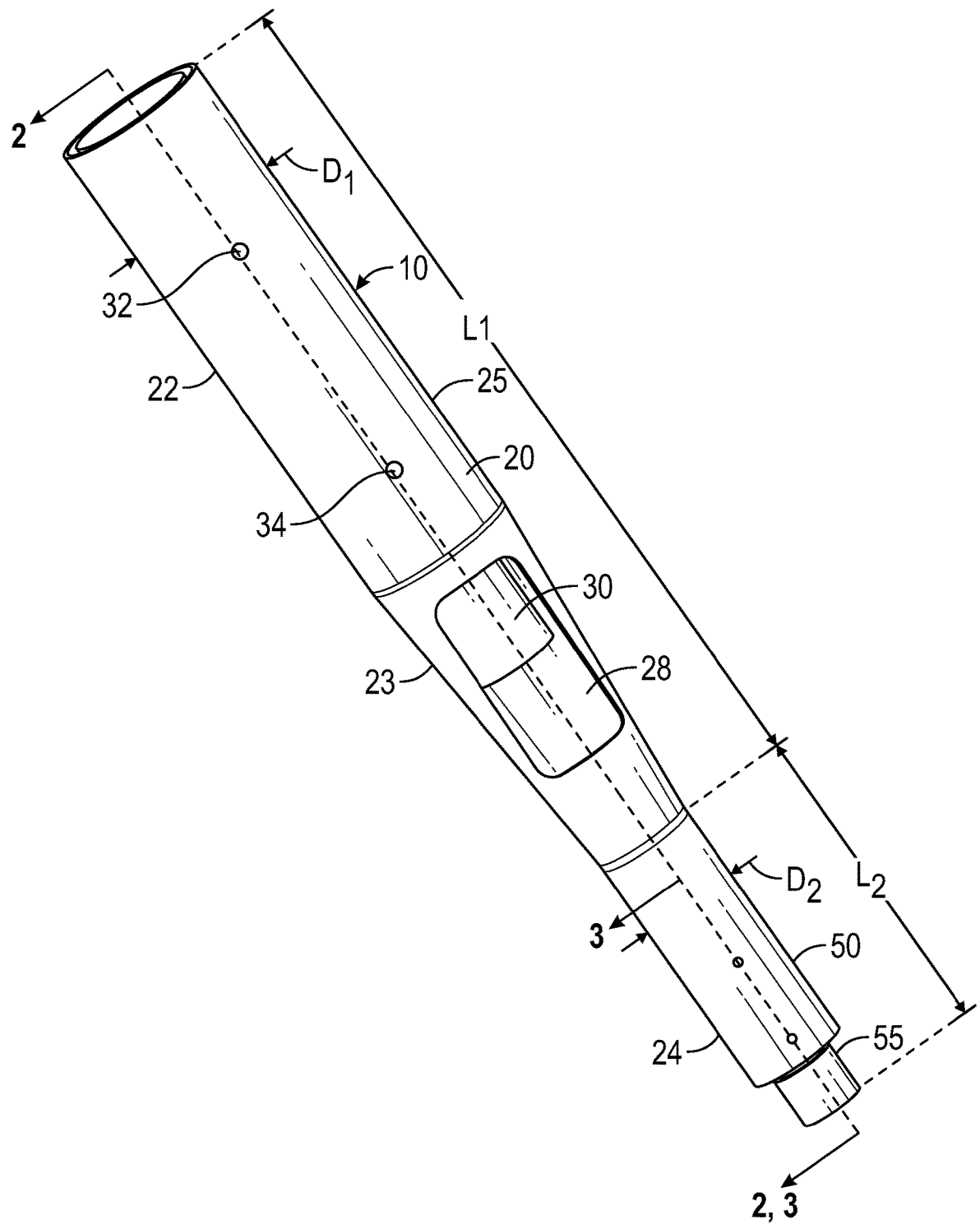
FIG. 1 is a front perspective view of a first embodiment of the present invention engaged with an extruded hosel.

A preferred, first embodiment of the mandrel 10 is shown in FIGS. 1-2. As shown in these Figures, the mandrel 10 includes a one-piece, tubular housing 20 composed of a metal alloy, preferably a high wear resistant A2 steel with a 59-60 HRC, with an outer surface 25 comprising a coating, preferably titanium aluminum nitride, to prevent wear. The single piece construction of the housing 20 maintains the concentricity of the device better than prior art, three-piece solutions, because any tolerance stack-up between pieces is eliminated.

Figure 4:
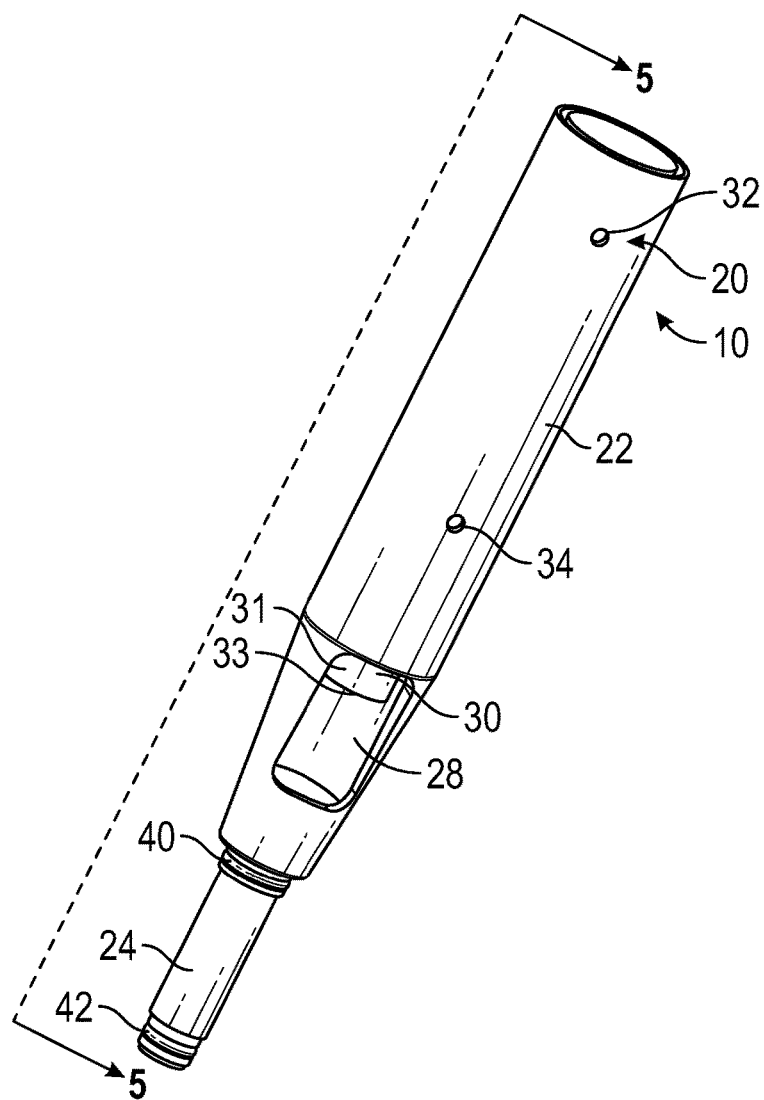
FIG. 4 is a front perspective view of a second embodiment of the present invention.
Figure 5:
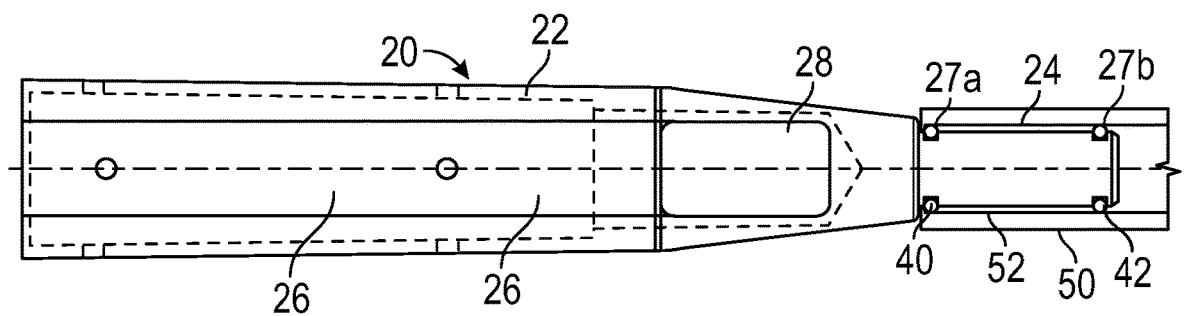
FIG. 5 is a cross-sectional view of the mandrel shown in FIG. 4 without a laser taken along lines 5-5 and engaged with a hosel.

The housing 20 comprises an upper portion 22 with a first maximum diameter $D_1$ of 0.40 to 0.75 inch and a first length $L_1$ of 3.00 inches to 6.00 inches, a lower portion 24 with a second diameter $D_2$ of 0.15 to 0.50 inch and a second length $L_2$ of 1.00 inch to 2.00 inches that is less than the first diameter $D_1$, and a hollow portion or bore 26 extending into both the upper and lower portions 22, 24. The diameter of the bore 26 in the first embodiment varies throughout the mandrel 10; it is wide enough to receive the laser 30 at the upper portion 22, and in the lower portion 24 is sized to receive an extruded hosel 55, such as a putter hosel 55. In the second embodiment, shown in FIGS. 4-5, the diameter of the through bore 26 may be any size, including smaller than the diameter of the upper portion through bore 26, whichever is best for dialing in mass of the overall mandrel design 10.

The upper portion 22 of the housing 20 also includes a cutout or window 28 in communication with the bore 26. The upper portion 22 tapers in diameter to meet the lower portion 24, and the window 28 is disposed within this tapered section 23 of the upper portion 22. The laser 30 is disposed within the through-bore 26 of the upper portion 22 so that at least a portion of the laser 30 is visible through the window 28. The laser 30, which comprises a laser housing 31 and a beam emitter 33, has precision alignment between the laser housing 31 to the outer surface 25 of the one-piece housing 20 to less than 0.35 milliradian ("mrad"). The alignment between the laser housing 31 and a laser beam emitted by the beam emitter 33 is preferably less than 0.5 mrad, but can be dialed in to 0. The laser beam emitted by the beam emitter 33 extends through the bore 26 of the upper portion 22 and out of the mandrel 10. The final adjustment of the laser 30 concentricity is by set screws 32, 34 extending into an upper portion 22 of the housing 20 to further increase repeatability. Preferably, eight set screws 32, 34 are disposed within the housing to center the laser 30, and are locked in place by nylon thread lockers 36. The laser 30 is preferably a precision concentric laser.

O-rings 40, 42 are disposed at the top and bottom portions of the lower portion 24 of the housing 20. They preferably fit within grooves 27a, 27b that are disposed in the lower portion 24 and are sized to receive the o-rings 40, 42. These o-rings 40, 42 create an interference fit within the hosel bore 52 or around an extruded hosel 55, and preferably are made from a high durometer (90 A) polyurethane with properties to be used in high wear applications. The o-rings 40, 42 create uniform pressure or a uniform seal which centers the mandrel 10 within or around the hosel.

Preferably, multiple versions of the mandrel 10 of the present invention are created so that each hosel process has a mandrel 10 dedicated to it that allows the hosel process to obtain the tightest fit between mandrel 10 and hosel bore 52 or extruded hosel 55.

Figure 6:
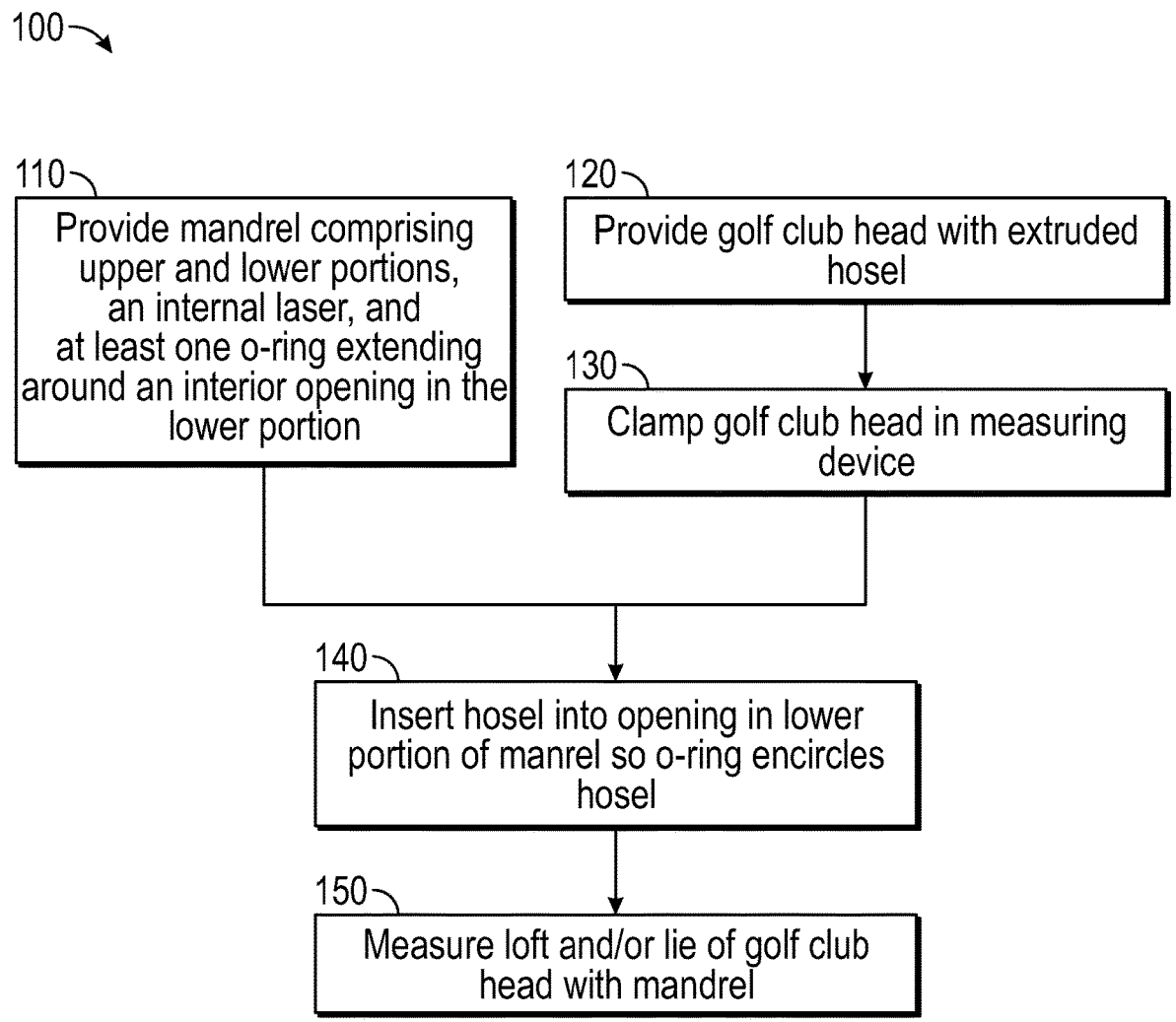
FIG. 6 is a flow chart illustrating a first method of the present invention.

The mandrel 10 of the present invention is used to measure the loft and lie of a golf club head to ensure that it is made to specifications. As illustrated in FIG. 6, a method 100 of using the first embodiment of the mandrel 10 includes providing the mandrel 110 and providing a golf club head with an extruded hosel 120. The golf club head is clamped into a measuring device 130, and the hosel 55 is inserted into the hollow lower portion 24 of the mandrel 10 so the o-rings 40, 42 encircle the hosel 55 140 and create even pressure to ensure proper alignment. The mandrel is then used to measure the loft and/or lie of the golf club head 150.

Figure 7:
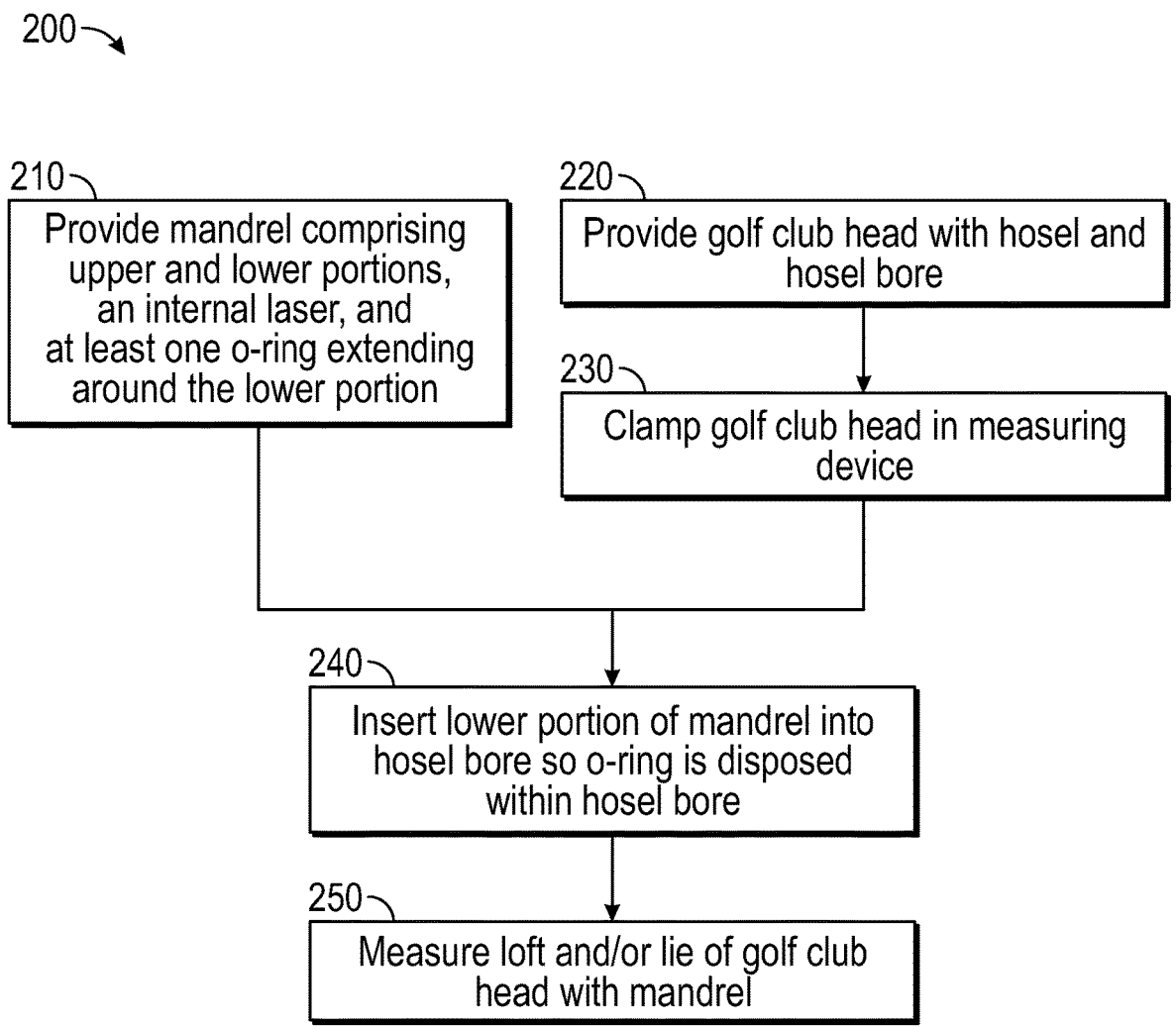
FIG. 7 is a flow chart illustrating a second method of the present invention.

A method 200 of using the second embodiment of the mandrel 10 is illustrated in FIG. 7. In this method, the second embodiment of the mandrel is provided 210, as is a golf club head with a hosel and hosel bore 52 220. The golf club head is clamped into a measuring device 230, and the lower portion 24 of the mandrel 10 is inserted into the hosel bore 52 so that the o-rings 40, 42 align the mandrel 10 within and with respect to the hosel and hosel bore 52 240. The o-rings 40, 42 create even pressure within the hosel bore 52 to ensure proper alignment. The laser 30 can be further adjusted to alignment using the set screws 32, 34. The mandrel is then used to measure the loft and/or lie of the golf club head 250.

The benefit of this invention is that hosels are aligned to target lie and loft. If the alignment is wrong, the resulting product does not confirm to the lie and loft to specification.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim as my invention:

1. A method comprising the steps of:
providing a self-centering mandrel comprising
a one-piece housing with upper and lower portions, the upper portion comprising a tapered section with a window, the lower portion comprising a plurality of grooves, and a housing bore extending into both of the upper and lower portions,
a laser disposed within the housing bore within the upper portion, the laser comprising a beam emitter and a laser housing that is at least partially visible through the window, the laser aligned with an outer surface of the one-piece housing to within less than 0.35 milliradian, at least one o-ring extending around an external surface of the lower portion of the housing and disposed within one of the plurality of grooves, and a plurality of set screws extending through the one-piece housing, contacting the laser, and aligning the laser within the one-piece housing, each set screw of the plurality of set screws comprising a thread locker;

providing a golf club head comprising a hosel with a hosel bore;

inserting at least the lower portion of the mandrel into the hosel so that the at least one o-ring is disposed within the hosel bore; and measuring at least one of a loft and lie of the hosel, wherein the at least one o-ring creates pressure within the hosel bore to center the mandrel within the hosel bore.

2. The method of claim 1, wherein the one-piece housing is composed of A2 steel and the at least one o-ring is composed of a high durometer polyurethane.

3. The method of claim 1, wherein the outer surface of the one-piece housing comprises a coating.

4. The method of claim 3, wherein the coating is titanium aluminum nitride.

5. The method of claim 1, wherein the plurality of set screws comprises eight set screws.

6. The method of claim 1, wherein the thread locker is composed of a nylon material.

7. The method of claim 1, wherein the upper portion has a length of 3 inches to 6 inches.

8. The method of claim 1, wherein the lower portion has a length of 1 inch to 2 inches.

9. The method of claim 1, wherein an alignment between the one-piece housing and a laser beam emitted by the beam emitter is less than 0.5 milliradian.

10. A method comprising the steps of:
providing a self-centering mandrel comprising
a one-piece housing with hollow upper and lower portions, the upper portion comprising a tapered section with a window, the lower portion comprising a plurality of grooves, and a housing bore extending into both of the upper and lower portions, a laser disposed within the housing bore within the upper portion, the laser comprising a beam emitter and a laser housing that is at least partially visible through the window, the laser aligned with an outer surface of the one-piece housing to within less than 0.35 milliradian, at least one o-ring disposed within the hollow lower portion and extending around an inner surface of the lower portion of the housing and disposed within one of the plurality of grooves, and a plurality of set screws extending through the one-piece housing, contacting the laser, and aligning the laser within the one-piece housing, each set screw of the plurality of set screws comprising a thread locker;

providing a golf club head comprising an extruded hosel;

inserting at least a portion of the extruded hosel into the lower portion of the housing so that the at least one o-ring encircles the extruded hosel; and measuring at least one of a loft and lie of the hosel, wherein the at least one o-ring creates pressure around the extruded hosel to center the mandrel around the extruded hosel.

11. The method of claim 10, wherein the one-piece housing is composed of A2 steel and the at least one o-ring is composed of a high durometer polyurethane.

12. The method of claim 10, wherein the outer surface of the one-piece housing comprises a coating.

13. The method of claim 12, wherein the coating is titanium aluminum nitride.

14. The method of claim 10, wherein the upper portion has a length of 3 inches to 6 inches.

15. The method of claim 10, wherein the lower portion has a length of 1 inch to 2 inches.

16. The method of claim 10, wherein an alignment between the one-piece housing and a laser beam emitted by the beam emitter is less than 0.5 milliradian.

\* \* \* \* \*